(12) United States Patent
Tupil et al.

(10) Patent No.: US 6,235,380 B1
(45) Date of Patent: *May 22, 2001

(54) LAMINATION OF MICROCELLULAR ARTICLES

(75) Inventors: Srinath P. Tupil, Chelmsford, MA (US); Klaus Büchner, Schaffhausen (CH); Patrick M. Lahmann, Somerville, OH (US)

(73) Assignee: Trexel, Inc., Woburn, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/919,590

(22) Filed: Jul. 24, 1997

(51) Int. Cl.$^7$ .......................................... B32B 3/26
(52) U.S. Cl. ................................... 428/314.4; 428/315.7; 428/315.9; 428/317.1
(58) Field of Search ............................. 428/314.4, 315.5, 428/315.7, 315.9, 317.1, 319.1

(56) References Cited

U.S. PATENT DOCUMENTS

| | | |
|---|---|---|
| 3,227,664 | 1/1966 | Blades et al. . |
| 3,227,784 | 1/1966 | Blades et al. . |
| 3,277,221 | 10/1966 | Parrish . |
| 3,375,211 | 3/1968 | Parrish . |
| 3,375,212 | 3/1968 | Bonner, Jr. . |
| 3,384,531 | 5/1968 | Parrish . |
| 3,584,090 | 6/1971 | Parrish . |
| 3,605,848 | 9/1971 | Lombardi et al. . |
| 3,637,458 | 1/1972 | Parrish . |
| 3,787,543 | 1/1974 | Parrish . |
| 3,812,225 | 5/1974 | Hosoda et al. . |
| 4,086,384 | * 4/1978 | Adelman et al. ................. 428/213 |
| 4,180,427 | * 12/1979 | Bertsch ............................ 156/272.6 |

(List continued on next page.)

FOREIGN PATENT DOCUMENTS

| | | |
|---|---|---|
| 1 145 932 | 5/1983 | (CA) . |
| 0 707 935 | 4/1996 | (EP) . |
| 0 799 853 A1 | 10/1997 | (EP) . |
| 0 818 292 A2 | 1/1998 | (EP) . |
| WO 89/00918 | 2/1989 | (WO) . |
| WO 90/07546 | 7/1990 | (WO) . |
| WO 95/24440 | 9/1995 | (WO) . |
| WO 98/00469 | 1/1998 | (WO) . |
| WO 98/00470 | 1/1998 | (WO) . |
| WO 98/08667 | 3/1998 | (WO) . |
| WO 98/31521 | 7/1998 | (WO) . |

OTHER PUBLICATIONS

Park et al., "Effect of the Pressure Drop Rate on Cell Nucleation in Continuous Processing of Microcellular Polymers", Polymer Engineering and Science, 35:432–440, Mar. 1995.

Park et al., "Filamentary Extrusion of Microcellular Polymers Using a Rapid Decompressive Element", Polymer Engineering and Science, 36:34–48, Jan. 1996.

Baldwin et al., "A Processing System for the Extrusion of Microcellular Polymer Sheets: Shaping and Cell Growth Control", Cellular and Microcellular Materials ASME, 53:85–107, 1994 (No Month).

*Primary Examiner*—Blaine Copenheaver
(74) *Attorney, Agent, or Firm*—Wolf, Greenfield & Sacks, P.C.

(57) ABSTRACT

Articles including material laminated to a surface of a microcellular substrate are disclosed, as well as methods of making these articles. Microcellular polymeric material in sheet form can be extruded and continuously fed from the extruded to a lamination system, or microcellular sheet can be produced and stored, and then fed into a lamination system.

12 Claims, 5 Drawing Sheets

U.S. PATENT DOCUMENTS

| | | |
|---|---|---|
| 4,263,360 * | 4/1981 | Adelman ............................ 428/238 |
| 4,272,467 | 6/1981 | Johnson . |
| 4,473,665 * | 9/1984 | Martin-Vvedensky et al. ....... 521/79 |
| 4,584,225 | 4/1986 | Adelman . |
| 4,698,254 | 10/1987 | Raszewski . |
| 4,761,256 * | 8/1988 | Hardenbrook et al. ............. 264/45.5 |
| 4,791,144 | 12/1988 | Nagou et al. . |
| 4,877,679 * | 10/1989 | Leatherman et al. ................... 442/58 |
| 5,034,171 | 7/1991 | Kiczek et al. . |
| 5,110,998 | 5/1992 | Muschiatti . |
| 5,128,382 | 7/1992 | Elliott, Jr. et al. . |
| 5,149,579 * | 9/1992 | Park et al. ........................... 428/213 |
| 5,158,986 | 10/1992 | Cha et al. . |
| 5,160,674 | 11/1992 | Colton et al. . |
| 5,181,717 | 1/1993 | Donntag et al. . |
| 5,182,307 | 1/1993 | Kumar . |
| 5,334,356 | 8/1994 | Baldwin et al. . |
| 5,358,675 | 10/1994 | Campbell et al. . |
| 5,437,924 * | 8/1995 | Decker III et al. ................ 428/318.4 |
| 5,500,450 | 3/1996 | Simandl et al. . |
| 5,571,848 | 11/1996 | Mortensen et al. . |
| 5,670,102 | 9/1997 | Perman et al. . |
| 5,684,055 | 11/1997 | Kumar et al. . |
| 5,830,393 | 11/1998 | Nishikawa et al. . |
| 5,851,617 * | 12/1998 | Keiser ................................. 428/41.8 |
| 5,866,053 | 2/1999 | Park et al. . |

* cited by examiner

LAMINATION OF MICROCELLULAR ARTICLES

FIELD OF THE INVENTION

The present invention relates generally to lamination, and more particularly to lamination onto a surface of a microcellular polymeric article.

BACKGROUND OF THE INVENTION

Foamed polymeric materials are known, and typically are produced by injecting a chemical or physical blowing agent into a molten polymeric stream, mixing the blowing agent with the polymer, and extruding the mixture into the atmosphere while shaping the mixture. Exposure to atmospheric conditions causes the blowing agent to expand and to form cells in the polymer. Batch processes, that is, those in which a batch of material is treated to make a foam, rather than continuous treatment of a stream of material, are known as well.

Microcellular material is defined as cell-containing material of very small cell size. U.S. Pat. No. 4,473,665 (Martini-Vvedensky, et al.; Sep. 25, 1984) describes a process for making foamed polymer having cells less than about 100 microns in diameter. In the described technique, a material precursor is saturated with a blowing agent, the material is placed under high pressure, and the pressure is rapidly dropped to nucleate the blowing agent and to allow the formation of cells. The material then is frozen rapidly to maintain a desired distribution of microcells.

U.S. Pat. No. 5,158,986 (Cha, et al.; Oct. 27, 1992) describes formation of microcellular polymeric material using a supercritical fluid as a blowing agent. In a batch process of Cha, et al., a plastic article is submerged in supercritical fluid for a period of time, and then quickly returned to ambient conditions. In a continuous process, a polymeric sheet is extruded, then run through rollers in a container of supercritical fluid at high pressure, and then exposed quickly to ambient conditions. In another continuous process, a supercritical fluid-saturated molten polymeric stream is established. The stream is rapidly heated, and the resulting thermodynamic instability (solubility change) creates sites of nucleation, while the system is maintained under pressure preventing significant growth of cells. The material then is injected into a mold cavity where pressure is reduced and cells are allowed to grow.

Lamination of one layer or film of material to another layer or film of material to form a multi-layered structure is useful for a variety of purposes, including improved structural and mechanical properties of material, reduction of material having a desired bulk property with different, desired surface properties, and the like. Laminate articles including at least one foam layer are known, and one example of such a laminate article is artboard, which typically is made of a foamed core polymeric sheet with facing sheet adhered to one or both sides of the foam core sheet via an adhesive. For example, U.S. Pat. No. 4,180,427 (Bertsch) describe lamination of a coating on one or both surfaces of a thermoplastic sheet material, such as polystyrene foam. A corona discharge is directed against the surface of the thermoplastic material prior to lamination, which improves adhesion. U.S. Pat. No. 5,437,924 (Decker, et al.) describes a biodegradable foam core board for use as artboard, signage, display boards, etc. Decker, et al. refer to known, laminated structures including a paperboard facing adhered to a polystyrene foam core.

Decker, et al. disclose foaming a polymer foam core sheet with blowing agents such as alcohols including methanol, ethanol, propanol, and butanol or endothermic blowing agents such as those available from the Reedy International Corp., including sodium salts of carbonic, polycarbonic, polycarboxylic acids and carbonate compounds. Decker, et al. discloses using a latex binder adhesive such as one sold under the designation AIRFLEX™ 4000 Latex Binder from Air Products Co. for adhering paperboard laminate to a foam core sheet with pressure applied to the resultant sandwich structure until the adhesive bonding was set. Another exemplified adhesive was a self-catalyzing polyvinyl acetate water-based adhesive. Conventional lamination processes involve passing a core sheet and surface-coating laminate layers through nip rollers while heating the material to cause an adhesive to be activated and to adhere the surface layer to the core. In many cases, when hydrocarbon or other flammable blowing agents are used to foam the core, the core is allowed to degas for approximately 36 hours or more so that fewer flammable gases are present during the hot-nip roller lamination procedure, and a fire hazard thereby is avoided. Foam core sheet also may be degassed for a period of time so that the cells within the sheet do not contain high concentrations of highly-expandable blowing agents, minimizing expansion during the hot lamination process. Where relatively high molecular weight blowing agents are used, diffusion from the foam and equilibrium with the ambient environment may be relatively slow (compared to low molecular weight blowing agents $CO_2$ and $N_2$), thus there is motivation for allowing the material to degas for an extended period of time.

As in almost any manufacturing process, simplicity, efficiency, avoidance of unnecessary process steps, and accompanying minimized expense is desirable. Accordingly, it is an object of the invention to provide a simplified lamination process, and related laminate articles.

SUMMARY OF THE INVENTION

The present invention provides efficient lamination processes and related laminate articles that result from unexpected improvement in lamination where a microcellular core is used or, in another aspect, where a low molecular weight, non-flammable blowing agent is used.

In one aspect, the invention provides a multi-layered article that is made of a first portion of a first, microcellular material and a second portion of a second material. The second material is adhered to the first portion. In one embodiment, the second material is adhered to the first material in the absence of auxiliary adhesive.

In another aspect, the invention provides a multi-layer article including a first, polymer foam layer and a second, non-polymer layer adhered to the first layer. The article, according to this aspect, has a thickness of less than 0.150 inch.

In another aspect, the invention provides a laminate article including at least one carbon dioxide-blown polymeric foam layer.

In another aspect, the invention provides a laminate article including at least one polymeric foam layer blown essentially entirely with a non-flammable blowing agent. In one embodiment the blowing agent is essentially completely carbon dioxide.

In another aspect, the invention provides methods for laminating articles. A method, in one embodiment, includes the process of laminating a film of material to a surface of a microcellular article.

In another aspect, the invention involves a process for laminating a film onto a surface of a foam article less than three days after foaming of the foam article.

In another aspect, the invention involves laminating a film of material to a surface of a polymer article where the polymer article has a thickness of less than 0.150 inch.

In another aspect, the invention provides a method of laminating a film onto a surface of an article blown with a physical blowing agent having a molecular weight of less than 100.

In another aspect the invention provides a method of laminating a laminate material to a surface of a microcellular article. The article is one that has not been treated by corona discharge, and no auxiliary adhesive is used. The material is adhered to the microcellular article surface via the method, and not removable therefrom without at least partial destruction of at least one of the laminate material or the microcellular article.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure.

DETAILED DESCRIPTION OF THE INVENTION

Commonly-owned U.S. provisional patent application Ser. No. 60/024,623, entitled "Method and Apparatus for Microcellular Extrusion", filed Aug. 27, 1996 by Burnham, et al.; commonly-owned U.S. provisional patent application Ser. No. 60/026,889 entitled "Method and Apparatus for Microcellular Extrusion", filed Sep. 23, 1996 by Kim, et al.; and Commonly-owned U.S. patent application Ser. No. 08/777,709, entitled "Method and Apparatus for Microcellular Extrusion", filed Dec. 20, 1996 by Burnham, et al., (abandoned) all are incorporated herein by reference.

The present invention provides a system for lamination involving microcellular or supermicrocellular polymeric material. For purposes of the present invention, microcellular material is defined as foamed material containing cells of size less than about 100 microns in diameter, or material of cell density of generally greater than at least about $10^6$ cells per cubic centimeter, or preferably both. Preferably, microcellular material of the invention contains cells of size less than about 80 microns in diameter, more preferably less than about 70 microns in diameter, more preferably less than about 50 microns in diameter. The void fraction of microcellular material generally varies from 5% to 98%. In some embodiments, the microcellular material can have a void fraction of 90% or more. Supermicrocellular material is defined for purposes of the invention by cell sizes smaller than 1 $\mu$m and cell densities greater than $10^{12}$ cells per cubic centimeter. Ultramicrocellular material is defined for purposes of the invention by cell sizes smaller than 0.1 $\mu$m and cell densities greater than $10^{15}$ cells per cubic centimeter.

In preferred embodiments, microcellular material of the invention is produced having average cell size of less than about 30 microns, more preferably less than about 20 microns, more preferably less than about 10 microns, and more preferably still less than about 5 microns. The microcellular material preferably has a maximum cell size of about 50 microns, preferably about 35 microns, more preferably about 25 microns, and more preferably still about 15 microns. A set of preferred embodiments includes all combinations of these preferred average cell sizes and maximum cell sizes. That is, a preferred embodiment in this set of embodiments includes microcellular material having an average cell size of less than about 30 microns with a maximum cell size of about 50 microns, in a more preferred embodiment an average cell size of less than about 30 microns with a maximum cell size of about 35 microns, etc.

In one embodiment, essentially closed-cell microcellular material is used. As used herein, "essentially closed-cell" is meant to define material that, at a thickness of about 100 microns, contains no connected cell pathway through the material.

A variety of techniques for forming microcellular material can be used in connection with the invention, including those disclosed in the above-referenced applications of Burnham, et al. and Kim, et al., as well as those disclosed in U.S. Pat. Nos. 5,158,986, 4,473,665, and 5,160,674, each incorporated herein by reference.

The present invention facilitates laminate articles free of auxiliary adhesive. As used herein, "an auxiliary adhesive" is meant to define an ingredient added between the core article and the laminate layer, or added to the core article or laminate layer, for the purpose of adhesive bonding between the two layers. Those of ordinary skill in the art are familiar with auxiliary adhesives, and appreciate the meaning of the description of the embodiment of the invention involving a material adhered to a portion of a microcellular material in the absence of auxiliary adhesive.

The invention provides a multi-layered article, or laminate article, including a microcellular article as one component. As used herein "laminate" is meant to define an article having at least two components in contact with and adhered to each other, where "adhered" can be defined by a relationship with an adjacent material in which, when an attempt is made remove one material from the other, one tears. That is, adhesive forces are greater than cohesive forces for in at least one material. This means that the invention can involve a method including laminating a laminate material to a surface of a microcellular article that has not been treated by corona discharge and in the absence of auxiliary adhesive, the material being adhered to the microcellular article surface and not removable therefrom without at least partial destruction of at least one of the laminate material or the microcellular article.

In accordance with the invention, lamination of standard lamination material on foam sheet, such as is produced for artboard or the like, when carried out with microcellular foam sheet, does not require auxiliary adhesive in many cases, nor pre-treatment of the microcellular foam sheet or laminating material with corona discharge. This aspect is not limited to paper layers laminated to foam sheet for artboard, but has ramifications applicable to essentially any arrangement in which any material is desirably adhered to a foam core. Where the foam core is microcellular, adhesion is made easier and less expensive.

Figure 1:
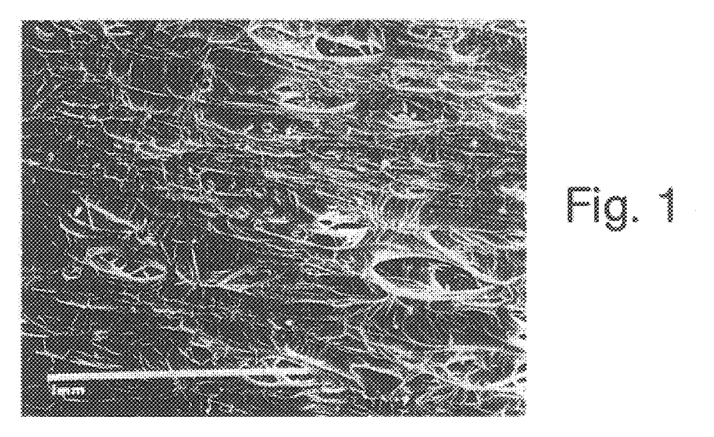
FIG. 1 is a photocopy of a scanning electron micrograph (SEM) image of polystyrene microcellular sheet produced in accordance with the invention for forming a laminate article.
Figure 2:
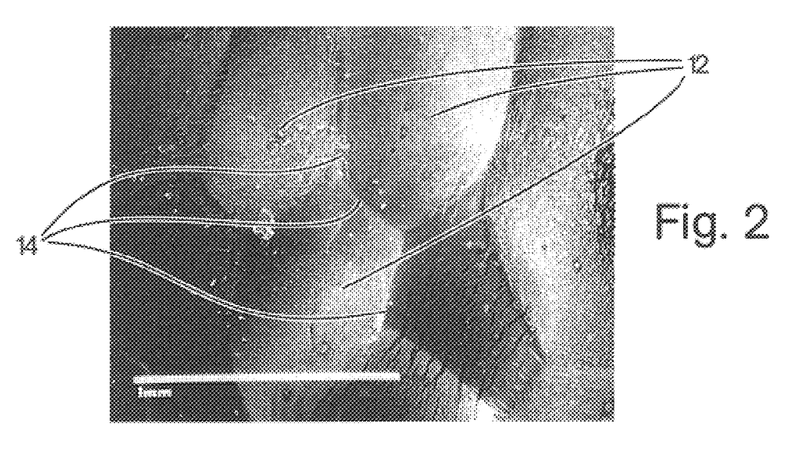
FIG. 2 is a photocopy of an SEM image of comparative, non-microcellular sheet.
Figure 3:
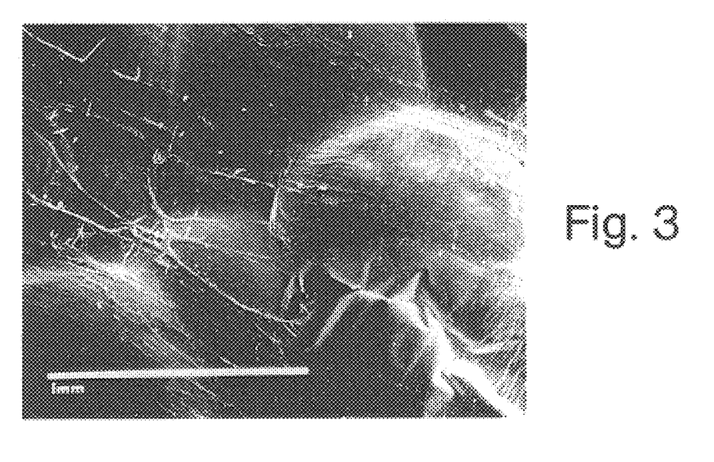
FIG. 3 is another photocopy of an SEM image of comparative, non-microcellular sheet.

While not wishing to be bound by any theory, the applicants propose that the improved results observed with microcellular material are due to the fact that microcellular material can provide a surface in which variations from perfect planarity in the surface are minimized relative to standard foam material. With minimal variations from planarity, increased surface area contact between the foam core and a laminate sheet is proposed to be much easier to achieve. The ease with which high-surface-area contact between a microcellular article and a laminate layer, as opposed to a standard foam article and laminate layer, can be appreciated with references to FIGS. 1–7. FIG. 1 is a photocopy of an SEM image of microcellular polystyrene. The very small overall cell size results in a surface with topological features that are relatively small. FIGS. 2 and 3 are SEM image of standard, macrocellular polystyrene foam. Apparently relatively large, raised apexes 12, and valleys 14 between the raised cells, define topological variation that represents a large deviation from a planar surface.

Figure 4:
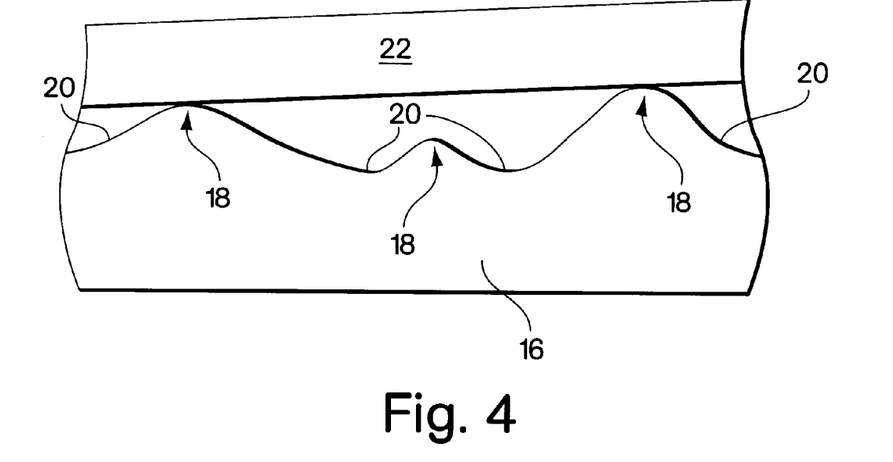
FIG. 4 is a proposed representation of a prior art foam article and laminate layer, prior to lamination.

FIGS. 4–7 illustrate, schematically, the proposed result of the difference between standard foam core and microcellular foam core in laminate articles. FIG. 4 shows a portion 16 of standard foam core. Only that portion near the surface of the foam core is shown. Standard foam 16 includes a macrocellular structure including cell apexes 18 and valleys 20 between the cells that, together, define a topological structure that varies significantly from planarity. A laminate sheet 22 of paper, or the like, rests upon conventional foam core 16, supported by two of the apexes 18.

Figure 5:
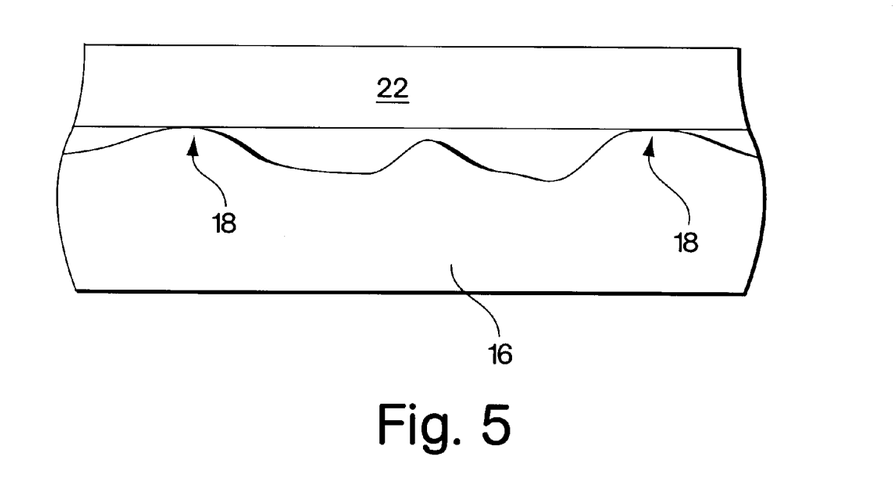
FIG. 5 is a proposed representation of a prior art foam article and laminate layer, following lamination.

FIG. 5 is a proposed representation of the arrangement of FIG. 4 following lamination through nip rollers. It is proposed that, even after lamination, because of the wide deviation from planarity of the surface of the standard foam core, adhesive contact between paper laminate layer 22 and foam core 16 is limited to several regions at apexes 18 of the cells of the standard foam core.

Figure 6:
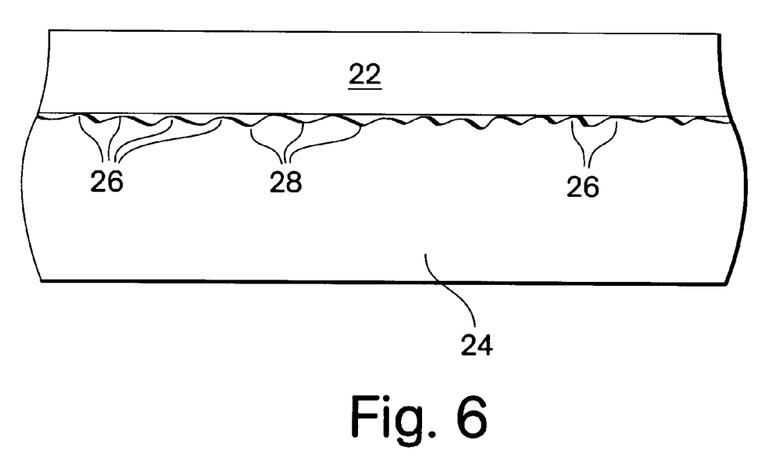
FIG. 6 is a proposed representation of a microcellular article of the invention and a laminate layer, prior to lamination.

FIG. 6 is a proposed, schematic illustration of paper laminate layer 22 resting on a portion 24 (only a portion near the surface is illustrated) of a microcellular foam core sheet. The microcellular sheet 24 includes very small cells relative to the cells of conventional foam core 16, and a plurality of small apexes 26, separated by valleys 28, are present, defining a topological structure that varies only slightly from planarity, as compared to standard foam core 16.

Figure 7:
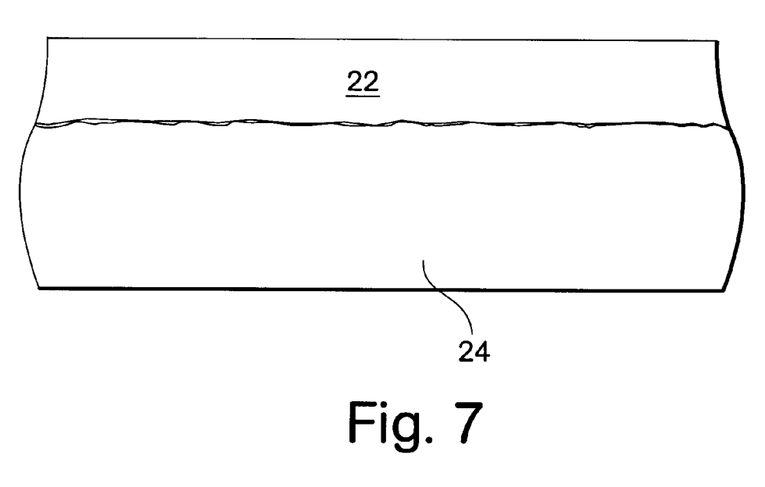
FIG. 7 is a proposed representation of a microcellular article of the invention and laminate layer, following lamination.

FIG. 7 is a proposed schematic illustration of the arrangement of FIG. 6 following lamination through nip rollers, in which the surface area of contact between paper laminate layer 22 and microcellular foam core 24 is much higher than the area of contact in the conventional product of FIG. 5, due to the fact that only slight compliance in the facing surfaces of paper laminate layer 22 and foam core layer 24 is required for a very high percent of surface area contact.

Figure 8:
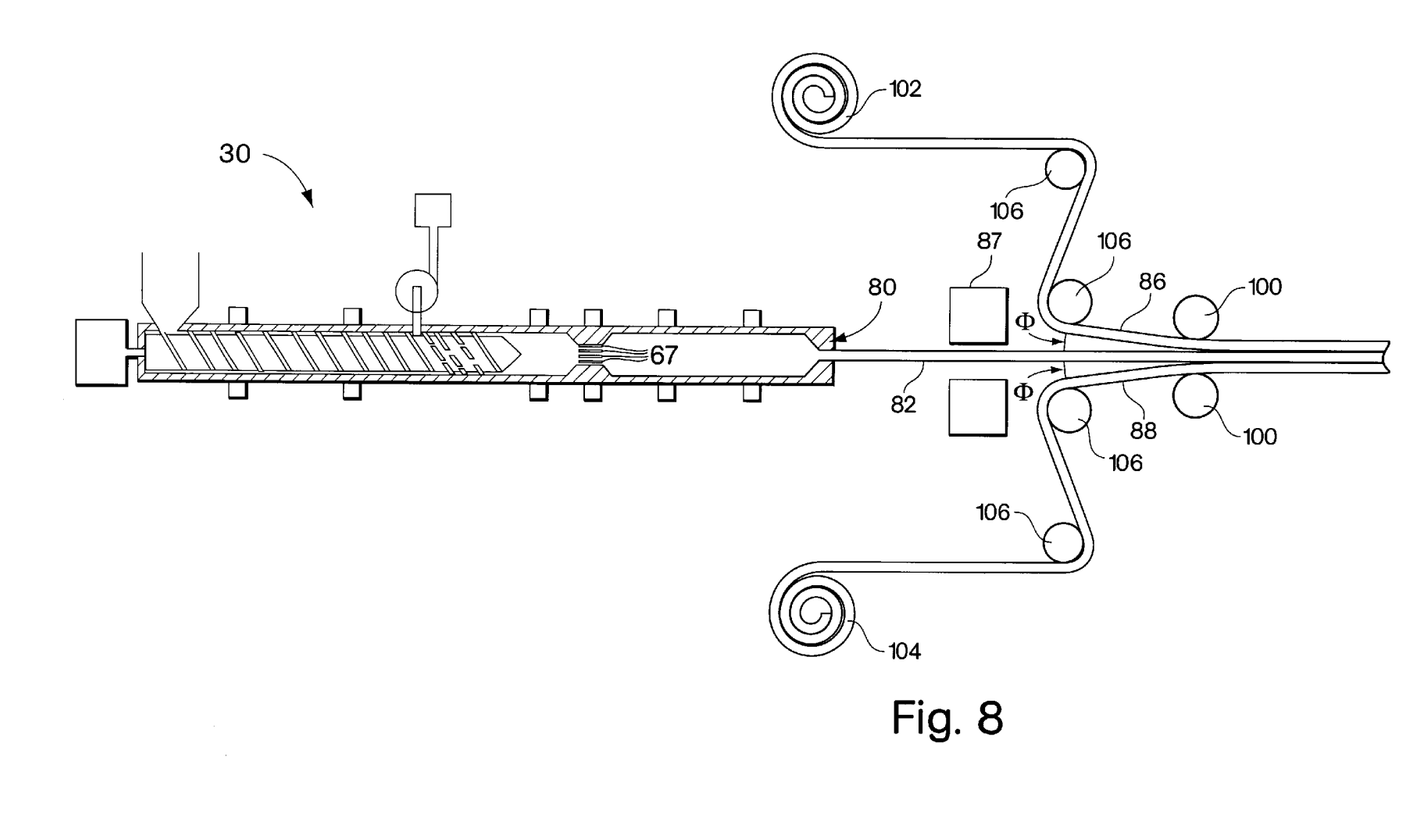
FIG. 8 illustrates a lamination system of the invention in which extrusion apparatus feeds microcellular sheet directly to lamination rollers.

Referring now to FIG. 8, a system for lamination involving microcellular material is illustrated schematically. In FIG. 8 a specific microcellular extrusion system is shown for purposes of illustration only. It is to be understood that microcellular material formed via the system illustrated, via other systems such as batch processes, and the like are embraced by the present invention. Continuous extrusion of microcellular sheet is preferred.

A microcellular extrusion system 30 according to one embodiment of the invention is illustrated schematically. This system is described in detail in the above-noted U.S. patent application Ser. No. 08/777,709, now abandoned, incorporated herein by reference. Extrusion system 30 includes a barrel, an extrusion screw operably connected to a drive motor, temperature control units, a hopper for receiving material including, without limitation, styrenic polymers, polyolefins such as polyethylene and polypropylene, fluoropolymers, crosslinkable polyolefins, polyamides, polyaromatics such as polystyrene and polyvinyl chloride, and a source of a blowing agent. Any of a wide variety of blowing agents known to those of ordinary skill in the art such as hydrocarbons, chlorofluorocarbons, nitrogen, carbon dioxide, and the like can be used in connection with the invention. However, in one set of preferred embodiments, a non-flammable blowing agent is used. Non-flammable blowing agents can be easily selected by those of ordinary skill in the art, such as physical blowing agents that are essentially free of C—H bonds. For example, in this set of preferred embodiments hydrocarbons such as alcohols, including partially-but not fully-halogenated hydrocarbons should be avoided.

In another set of preferred embodiments, a physical blowing agent having a molecular weight of less than about 500, more preferably less than about 250, more preferably less than about 100, and more preferably still less than about 50, is used. The low-molecular weight blowing agent, according to this set of embodiments, more readily diffuses from within cells following foam formation and, therefore, if the blowing agent is more readily expandable than air, or is flammable, then the foam product can be used, following foaming, more rapidly than in comparative cases. Where the blowing agent is flammable, but of low molecular weight, equilibrium within the cell with the ambient environment is more rapidly achieved, reducing the chance of combustion. Where the blowing agent is more readily expandable than air, the more rapid equilibrium will allow lamination at high temperature with minimized expansion.

The set of embodiments involving non-flammable and/or low molecular weight blowing agent is applicable to any foam product undergoing lamination or other high-temperature treatment, and not limited to microcellular product. This set of embodiments enables a method of the invention that involves laminating a film onto a surface of foam article less than three days after the foaming of the foam article, more preferably less than two days, more preferably less than one day, more preferably less than twelve hours, more preferably still less than one hour, and more preferably still less than one minute. In a particularly preferred embodiment, extrusion of a foam core is essentially immediately followed by lamination to the foam core, thus the invention involves a method of laminating a film onto a surface of the foam article less than about twenty seconds following foaming of the article. This set of embodiments also provides for a laminate article including at least one polymeric foam layer blown with a physical blowing agent having a molecular weight of less than about 500.

According to a particularly preferred embodiment, carbon dioxide is used as a blowing agent, and essentially 100% carbon dioxide is a preferred blowing agent for each of the above-mentioned aspects of the invention involving a non-flammable blowing agent or a blowing agent having a molecular weight of less than about 500 or lower. Where microcellular material is produced, supercritical fluid blowing agents are preferred.

System 30 can include a pressure and metering device to meter the blowing agent so as to control the amount of the blowing agent in the polymeric stream within the extruder, a die 80 constructed and arranged to extrude microcellular polymeric sheet 82 continuously.

Of course, any extrusion system 30 for continuously extruding polymer foam sheet, preferably microcellular foam sheet, can be used. Systems for extruding conventional foam sheet are well-known, and systems for extruding microcellular sheet are described in the above-referenced patent applications of Burnham, et al. and Kim, et al.

Following extrusion of sheet 82, the sheet can be passed through a corona discharge apparatus 84 to prepare the sheet for lamination (corona discharge is thought to create free radicals on the surface of the substrate, which modifies the surface energy, and/or burns away impurities and destroys residual monomer on the surface of the substrate; see U.S. Pat. No. 4,180,427).

Alternatively, lamination can take place without corona discharge cleaning of the sheet surfaces. It is one advantage of the present invention that corona discharge is not needed in connection with lamination of microcellular material, and in one set of embodiments of the invention microcellular sheet material is laminated without being corona treated.

In the lamination process, sheet 82 is fed between two sheets 86 and 88 of laminate sheet material, preferably paperboard material (kraft paper), between nip rollers 100. Although paperboard is presented for purposes of illustration, any coating material such as other papers, textiles, metal foils, plastic films, and other similar flexible sheet-like coating materials can be laminated onto foam material in accordance with the invention. Nip rollers 100 apply a pressure to laminate sheets 86 and 88, which in turn apply pressure to microcellular foam core sheet 82 adequate for lamination. The laminate sheet material 86 and 88 can be fed from spools 102 and 104, respectively, through feed rollers 106 which serve two purposes. Feed rollers 106 can include temperature control mechanisms for controlling temperature of the laminate sheet, preferably heating the sheet to facilitate lamination. Typical heating mechanisms include circulation through the rollers of a hot fluid such as oil, steam, or the like. Feed rollers 106 typically are heated to a temperature of 350–550° F. such that laminate sheets 86 and 88 are heated to a temperature within a range of about 350–450° F. In the embodiment illustrated, feed rollers 106 feed laminate sheet material 86 and 88 to the surface of foam core 82 at a very acute angle φ. The proximity of sheet material 86 and 88 to foam core 82 up line of nip rollers loo can cause, in prior art material, expansion of foam core 82 where the foam core includes highly-expandable blowing agent. Where a less-expansive blowing agent is used, expansion is minimized. Additionally, where lamination takes place directly downstream of continuous extrusion, the pressure within the cells of the foam typically is less than atmospheric pressure after cooling immediately after extrusion, but before heating during lamination, thus expansion is minimized. Furthermore, in the continuous extrusion process illustrated if FIG. 8, where a non-flammable blowing agent is used in accordance with the invention, the risk of combustion due to the temperature to which sheet 82 is exposed following extrusion (in a combustible ambient environment) is minimized. In an alternate embodiment, a system as described in U.S. Pat. No. 4,180,427, incorporated herein by reference, can be used.

Figure 9:
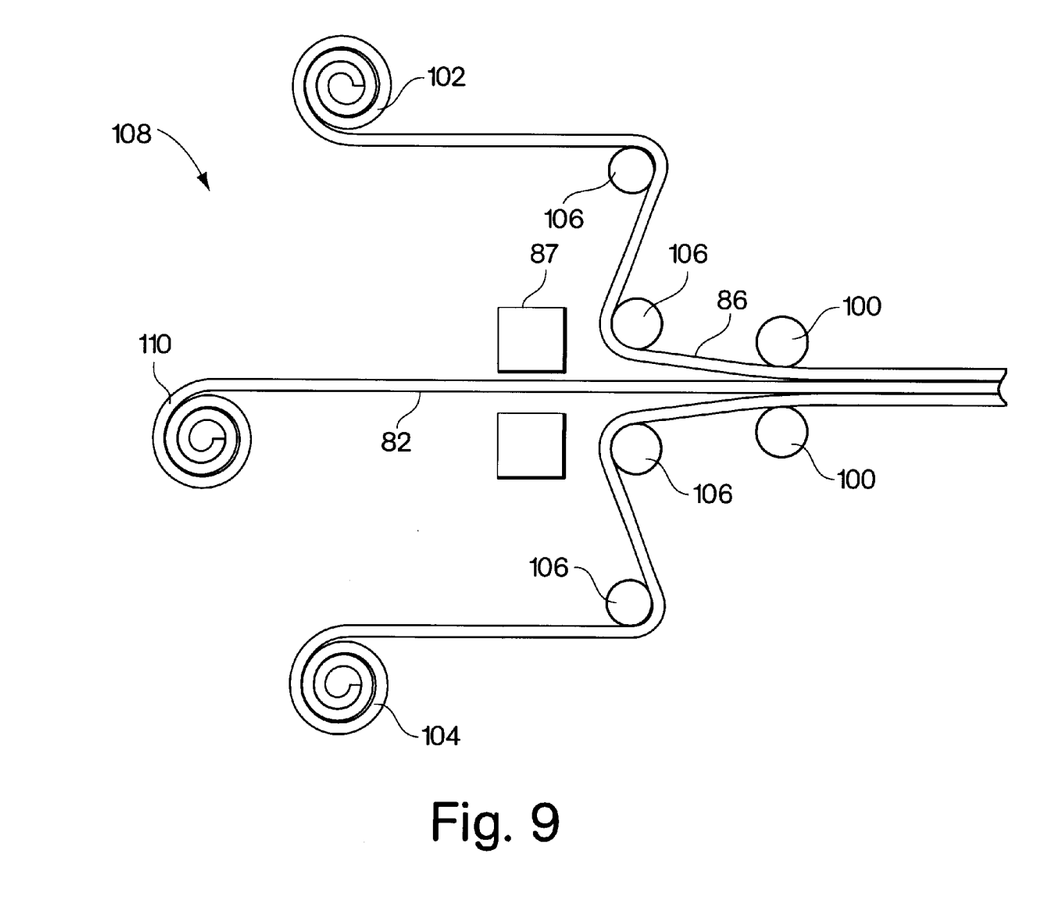
FIG. 9 illustrates a lamination system of the invention in which pre-extruded microcellular sheet is fed to lamination rollers.

Referring now to FIG. 9, an alternate lamination system 108 of the invention includes lamination of polymer foam sheet 82 fed from a spool 100 (or other source of polymer core sheet) rather than from a continuous extrusion apparatus as in FIG. 8. The arrangement of FIG. 9 can be used where it is desirable to allow the foam sheet to age prior to lamination. This can be advantageous in situations in which the gas pressure within cells of the foam is below atmospheric pressure (such as when cellular material is extruded at a relatively high temperature and rapidly cooled) and it is desirable to expand the foam slightly while heating during the lamination process.

As mentioned, the present invention includes lamination of microcellular material to essentially any other material, including other foam materials, other microcellular material, and the like. One advantage of the invention is the ability to use thermoformable, thin microcellular material as a layer in an overall laminate article for use in modified atmospheric packaging (MAP). In MAP, multiple layers of material are used to create barrier layers to avoid drying-out of food. The present invention provides techniques for forming multi-layer, laminate articles including microcellular material using techniques that are improvements over the existing state of the art. In particular, the use of non-flammable, atmospheric blowing agents allowing for direct extrusion or co-extrusion of multi-layer laminate articles results in reduction in production time and increased cost savings over prior techniques in which various layers that make up an overall multi-layer structure must be extruded, wound, degassed, and then unwound and laminated to each other.

Another advantage of using atmospheric acids in MAP is that extrusion, lamination, and thermoforming can be followed relatively quickly by use of the article in food packaging, while the use of hydrocarbon or other non-atmospheric blowing agents can require extensive degassing time to be certain that the article is safe for food packaging. This can be especially important in a central layer of a multi-layer structure, in which degassing can be hindered by adjacent barrier layers.

The function and advantage of these and other embodiments of the present invention will be more fully understood from the examples below. The following examples are intended to illustrate the benefits of the present invention, but do not exemplify the full scope of the invention.

EXAMPLE 1

Lamination of Microcellular Polymer with 12 mil Paper

Microcellular polystyrene sheets were laminated on each side with 0.012 inch paper to form a multi-layered structure. An extrusion system was used as described in U.S. patent application Ser. No. 08/777,709, now abandoned, referenced above. A polystyrene sheet of 11 inches width, 0.100 inch thickness in roll form was fed into a continuous lamination system as described in U.S. Pat. No. 4,180,427, incorporated herein by reference, at a line speed of at least 35 ft/min and up to 55 ft/min, and fed to a set of nip rollers approximately 24 inches after passing through a corona discharge. Two rolls of paper were fed to the heating rollers where the paper was heated and then fed to the nip rollers where the paper was laminated to the sheet. Expansion of the polymer sheet during lamination was negligible.

Essentially no expansion of the microcellular laminate article occurred during lamination, and the lamination was successful without auxiliary adhesive.

EXAMPLE 2
Comparative Lamination of Conventional Polymer

Lamination was carried out as in Example 1, but with conventional, macrocellular polystyrene sheet rather than the microcellular polymer sheet of the invention. Under identical conditions, delamination problems were observed.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A multi-layered article comprising a first portion of a first, essentially closed-cell microcellular material and a second portion of a paper-based sheet material adhered directly to the first portion, the microcellular material having an average cell size of less than about 80 microns and a void fraction of 90% or more.

2. An article as in claim 1, wherein the paper-based sheet material is adhered directly to the first microcellular material in the absence of auxiliary adhesive.

3. An article as in claim 1 comprising a sheet of microcellular material having a first side and an opposite second side, an adherent film of the paper-based sheet material adhered directly to the first portion and covering at least a portion of the surface of the first side.

4. An article as in claim 3, further comprising an adherent film of the paper-based sheet material adhered directly to the first portion and covering at least a portion of the surface of the second side.

5. An article as in claim 1, wherein the paper-based sheet material is laminated directly to the first portion of the first material.

6. An article as in claim 1, wherein the microcellular material is polystyrene.

7. An article as in claim 1, wherein the microcellular material has a maximum cell size of about 50 microns.

8. A multi-layered article as in claim 1, comprising a microcellular core sheet and outer-laminate paper-based sheet layers, the article having a thickness of less than 0.150 inch.

9. A multi-layer article as in claim 1 wherein the microcellular material is blown with a blowing agent and the article has a thickness of less than 0.150 inch.

10. The multi-layer article as in claim 9, wherein the microcellular material layer is blown with a physical blowing agent having a molecular weight of less than about 500.

11. The multi-layer article as in claim 9, wherein the microcellular material layer is blown with $CO_2$.

12. The multi-layer article as in claim 9, wherein the microcellular material layer is blown essentially entirely with a non-flammable blowing agent.

* * * * *